United States Patent Office 3,078,156
Patented Feb. 19, 1963

3,078,156
METHOD FOR ELIMINATING FLUORINE FROM PHOSPHATE ROCKS
Taro Yamaguchi, 4 of No. 1341 Marukouchi Ohaza, Onoda, Yamaguchi prefecture, Japan
No Drawing. Filed Oct. 16, 1957, Ser. No. 690,451
2 Claims. (Cl. 71—44)

The present invention relates to a method of eliminating fluorine from phosphate rock, more particular phosphate rock consisting mainly of tricalcium phosphate of apatite structure.

An object of the present invention is to eliminate a fluorine content remarkably efficiently from phosphate rock which consists mainly of tricalcium phosphate of apatite structure.

Another object of this invention is to perform the defluorination rapidly at low temperature after the addition of $Na_2O$ and $P_2O_5$ radicals to the crude rock, and in the presence of almost all the added $P_2O_5$ radical in the form of sodium phosphate.

Further objects, features and advantages of this invention will be apparent from the following descriptions.

Hitherto, an attempt of eliminating fluorine from phosphate rock by heating in the presence of water vapour after adding silicic acid thereto has been made since long. In such a procedure, however, an extremely high treating temperature is required. Therefore, such a procedure cannot be practiced industrially, unless the adding amount of silicic acid has been considerably increased and the fusion points of the mixture have been raised.

Also, with respect to the procedure for the similar treatment with addition of both silicic acid and sodium salt, various procedures have been proposed. However, in this case, it is needed to control additions of silicic acid and sodium salt so that $CaO$, $Na_2O$, $P_2O_5$ and $SiO_2$ in the mixture may produce two complex compounds, $2CaO \cdot Na_2O \cdot P_2O_5$ and $2CaO \cdot SiO_2$. Accordingly, the amount of addition of sodium salt will become exceedingly high.

Even though the attempt of eliminating fluorine from phosphate rock under heating in the presence of water vapour has been made since long, such attempt requires a considerably high temperature for treatment, which leads to a remarkably large amount of silicic acid to be added. Consequently, this procedure can only be effected with difficulty in an industrial practice, unless the fusing points of the mixture have been raised.

It is true that the addition of sodium salt lowers the defluorinating temperature for phosphate rock and accelerates the defluorinating velocity remarkably effectively. With regard to the reason why a large quantity of additions is required in the practical operation in a rotary kiln, the inventor considers as follows: Namely, the lime other than that which forms in the phosphate rock tricalcium phosphate [$Ca_3(PO_4)_2$] and calium fluoride [$CaF_2$] (hereinafter called "free lime") and $SiO_2$ react with $Na_2O$ at low temperatures, which is produced by the decomposition of added sodium salt, to produce a ternary compound of $Na_2O$—$CaO$—$SiO_2$ system, i.e. sodium calcium glass, which leads to reducing defluorinating action of $Na_2O$ and balling up of the mixture, thus disturbing water vapor from diffusion to the interior of the mixture.

Hence, the present inventor has tried to prevent the formation of above-mentioned ternary compound by fixing free lime in the crude rock by causing added $Na_2O$ radical partly or entirely to present in the form of sodium phosphate. With a result, it has been ascertained that a tendency of the mixture to balling up in the course of heating in a rotary kiln decreases, whereby it seemed all the added $Na_2O$ radicals would act effectively on the defluorinating reaction. It has also been found that, with increase of $P_2O_5$ presenting as sodium phosphate, the defluorination proceeds rapidly at a low temperature, and the sintered product increases also its refractoriness and the practical operation in the rotary kiln can be made extremely easily.

The present invention is based on this newly established knowledge and characterized in that the defluorination of phosphate rock by sintering the crude rock in the coexistence of water vapour is effected at a low temperature when $Na_2O$- and $P_2O_5$-radicals are added to the phosphate rock consisting mainly of tricalcium phosphate of apatite structure and then nearly the whole $P_2O_5$ radicals added is caused to exist in the form of sodium phosphate.

Further, when according to the present invention, $NaO_2$ radical as well as $P_2O_5$ radical is added to phosphate rock as described above and nearly the whole of the added $P_2O_5$ radicals is caused to exist in the form of sodium phosphate, the defluorination is carried out rapidly at low temperatures, and it has also been proved that a relatively small amount of $Na_2O$ radicals is sufficient for this purpose. With reference to such additional amounts, various experiments have been conducted in both laboratory and practical operation, and as a result thereof, amounts of additions of $P_2O_5$- and $Na_2O$-radicals have been found as follows:

$P_2O_5$ radical—0.5 to 1.2 mols to 3 mols of $CaO$ other than $CaO$ which combine with phosphoric acid in the phosphate rock to form tricalcium phosphate.

$Na_2O$ radical—0.5 to 1.5 mols to one mol of fluorine in the phosphate rock.

In the practical application of the present method, it is most simple to add sodium phosphate or sodium phosphate and sodium salt, such as Glauber's salt or sodium carbonate, directly to the phosphate rock, and knead the admixture, for example, at a temperature ranging from a room temperature to 60–70° C. in the presence of water. It is, however, possible to cause sodium phosphate to form during the course of the manufacture as in the following manner:

(1) Phosphoric acid solution is added to a mixture of phosphate rock with Glauber's salt or soda ash and mixed by kneading in the condition as described above. Sodium phosphate is then produced according to the following reactions:

$$CaO + 2H_3PO_4 \rightarrow Ca(H_2PO_4)_2$$

$$Ca_3(PO_4)_2 + 4H_3PO_4 \rightarrow 3Ca(H_2PO_4)_2$$

$$Ca(H_2PO_4)_2 + Na_2SO_4 + aq \rightarrow Ca(SO_4)_2aq + 2NaH_2PO_4$$

(2) Sodium salts, such as NaCl and $NaNO_3$ easily decomposable by heating in the presence of acid substance is mixed with the phosphate rock, to which phosphoric acid solution is added. The mixture thus obtained produces sodium phosphate according to the following reactions at a low temperature of 300 to 400° C. in the course of sintering up to the order of 1350° C.:

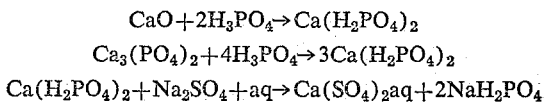

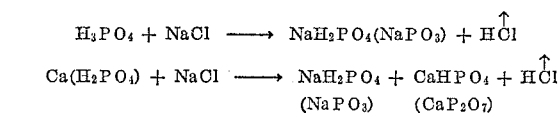

On the contrary, when phosphoric acid solution is added to the phosphate rock, dried and mixed with Glauber's salt, for instance in the above case (1), sodium phosphate would be hard to form both in the course of mixing and in the course of sintering, and with a result, the defluorination would not be sufficient in the practical operation in the rotary kiln, even when the predetermined amounts of $P_2O_5$- and $Na_2O$-radicals have been added.

Further, the amount of silicic acid to be coexistent in the present method is above 1 mol per mol of $Na_2O$ radical. Generally, as phosphate rock contains a considerable amount of silicic acid, it is not necessary in most cases to add silicic acid specifically.

Thus, according to this invention the fluorine in phosphate rock can be eliminated very effectively.

The present invention is further described in the following examples, which are illustrative but not limitive.

The phosphate rock used in the following examples is that which is produced in Florida and its chemical composition is as follows:

| Ignition loss | Percent | | | |
|---|---|---|---|---|
| | $SiO_2$ | CaO | $P_2O_5$ | $F_2$ |
| 3.98 | 8.15 | [1] 47.69 | 31.60 | 3.51 |

[1] CaO other than that which is contained in tricalcium phosphate 10.31%.

Example 1

20 parts of sodium phosphate ($NaH_2PO_4 \cdot 2H_2O$) was added to 100 parts of crude rock, mixed thoroughly and then heated in a quartz tube inserted in an electric tube furnace with passing water vapour raising from a predetermined temperature up to 1300° C. in one hour, immediately thereafter withdrawn and cooled rapidly. The additional amount of $P_2O_5$ radicals in this mixture was 1.03 mols to 3 mols of lime other than that which forms tricalciumphosphate. The additional amount of $Na_2O$ radicals was 0.69 mol to 1 mol of fluorine in the crude rock, and the mol ratio of $Na_2O$ and $P_2O_5$ in the composed mixture was 0.22. Further, the amount of water vapour passed through the tube during the heating was chosen 1.0 g. per minute and air passed therethrough was 6 liters per minute.

The result of the experiment is as follows:

| Starting temperature for heating, ° C. | Time required to heat up to 1,100°–1,200° C., minute | $F_2$ content in sintered material, percent |
|---|---|---|
| 700 | 20 | 0.06 |
| 800 | 24 | 0.04 |
| 900 | 30 | 0.01 |
| 1,000 | 40 | 0.01 |
| 1,100 | 60 | trace |

Example 2

30 parts of disodium phosphate ($Na_2HPO_4 \cdot 12H_2O$) was mixed with 100 parts of crude rock, mixed thoroughly and then sintered in a similar apparatus and conditions as in Example 1. The mixture was charged in the furnace of the sintering temperature of 1000° C., heated to 1300° C. in 90 minutes with passing water vapour and immediately thereafter withdrawn out of the furnace and cooled rapidly. The additional amount of $P_2O_5$ in the mixture thus composed was 0.68 mol to 3 mols of lime other than that which forms tricalcium phosphate. The additional amount of $Na_2O$ was 0.91 mol to 1 mol of $F_2$ in crude rock, and the ratio of $Na_2O$ and $P_2O_5$ in the mixture was 0.32.

The result of the experiment was as follows:

| | Percent |
|---|---|
| $F_2$ in the sintered material | 0.02 |
| Rate of defluorination | 99.4 |

Example 3

11 parts of anhydrous Glauber's salt was added to 100 parts of crude rock, to which was further added 22.5 parts of phosphoric acid solution containing 40% of $P_2O_5$, and mixed by kneading and then charged at 1000° C. in the furnace, wherein the mixture was heated up to 13,500° C. in 1 hour with passing water vapour, and immediately thereafter drawn out of the furnace and cooled rapidly.

In this mixture, the additional amount of $P_2O_5$ radicals was 1.03 mols to 3 mols of lime other than that which forms tricalcium phosphate, and the additional amount of $Na_2O$ radicals was 0.84 mol to 1 mol of $F_2$ in crude rock, and the mol ratio of $Na_2O$ and $P_2O_5$ in the mixture was 0.27.

The result of the experiment is as follows:

| | Percent |
|---|---|
| $F_2$ in the baking substance | 0.01 |
| Rate of defluorination | 99.7 |

Example 4

15 parts of table salt was added and mixed with 100 parts of crude rock, to which was further added 22.5 parts of phosphoric acid solution containing 40% of $P_2O_5$, and mixed thoroughly, and then treated similarly as in Example 3. The fluorine content in the sintered material was 0.02% and the rate of defluorination was 99.3%.

In this mixture, the additional amount of $P_2O_5$ radicals was 1.02 mols to 3 mols of lime other than which forms tricalcium phosphate, and the additional amount of $Na_2O$ radicals was 1.47 mols to 1 mol of $F_2$ in the crude rock, and the mol ratio of $Na_2O$- and $P_2O_5$-radicals was 0.47.

What I claim is:

1. In a method of defluorinating phosphate rock consisting mainly of tricalcium phosphate of apatite structure by heating the rock in the presence of a sodium salt, the improvement which comprises contacting the rock with a sodium phosphate in such quantity as to establish a concentration of 1 to 3 mols of sodium per mol of diatomic fluorine in the rock, there being 1 to 2.4 mols of sodium phosphate per mol of calcium in the rock other than the calcium which is present as tricalcium phosphate, thereafter sintering the mixture in the presence of water vapor, the phosphate of the sodium phosphate greatly reducing the quantity of sodium salt needed for defluorination, and recovering from the process a defluorinated phosphate rock.

2. In a method as claimed in claim 1, the step of forming the sodium phosphate in situ.

References Cited in the file of this patent

UNITED STATES PATENTS

| 1,880,491 | Rothe et al. | Oct. 4, 1932 |
| 2,479,389 | Maust et al. | Aug. 16, 1949 |
| 2,562,718 | Hollingsworth | July 31, 1951 |